United States Patent
Sawaki et al.

[19]

[11] Patent Number: 6,050,236
[45] Date of Patent: Apr. 18, 2000

[54] COVERING DEVICE FOR AN INTERNAL COMBUSTION ENGINE

[75] Inventors: Mikito Sawaki; Yoshiyuki Moroi, both of Yokohama, Japan

[73] Assignee: Nissan Motor Co., Ltd., Yokohama, Japan

[21] Appl. No.: 09/171,532

[22] PCT Filed: May 21, 1998

[86] PCT No.: PCT/JP98/02232

§ 371 Date: Oct. 21, 1998

§ 102(e) Date: Oct. 21, 1998

[87] PCT Pub. No.: WO98/54451

PCT Pub. Date: Dec. 3, 1998

[30] Foreign Application Priority Data

May 28, 1997 [JP] Japan ................................. 9-138459

[51] Int. Cl.⁷ .............................. F02F 7/00; F02M 51/00; F02B 75/22

[52] U.S. Cl. .................. 123/195 C; 123/90.31; 123/195 E; 123/54.4; 123/470

[58] Field of Search ................ 123/195 C, 90.31, 123/54.4, 54.5, 54.6, 54.7, 54.8, 478, 195 E, 470

[56] References Cited

U.S. PATENT DOCUMENTS

| 2,349,157 | 5/1944 | Ford et al. | 123/54.4 |
| 4,080,945 | 3/1978 | Hikosaka et al. | 123/195 C |
| 4,932,368 | 6/1990 | Abe et al. | 123/470 |
| 5,000,142 | 3/1991 | Aruga et al. | 123/195 C |
| 5,216,984 | 6/1993 | Shimano et al. | 123/41.44 |
| 5,329,907 | 7/1994 | Nonaka | 123/478 |
| 5,353,755 | 10/1994 | Matsuo et al. | 123/90.13 |
| 5,564,380 | 10/1996 | Kobayashi et al. | 123/192.2 |
| 5,568,794 | 10/1996 | Tabuchi et al. | 123/195 E |
| 5,755,207 | 5/1998 | Kushibe | 123/478 |

FOREIGN PATENT DOCUMENTS

| 4305684 A1 | 9/1993 | Germany | 123/195 E |

*Primary Examiner*—Tony M. Argenbright
*Assistant Examiner*—Brian Hairston
*Attorney, Agent, or Firm*—Foley & Lardner

[57] ABSTRACT

A covering device for an internal combustion engine shortens the harness used for driving fuel injection valves (and thus minimizes resistance, noise and voltage drop) and improves access to components for fuel leakage checking. Opening portions 20A, 20B are disposed on timing chain covers 1A, 1B. A solenoid driver 360 is located on a front surface of the opening portions 20A, 20B. A harness 361 passes through the opening portions 20A, 20B and is then connected to respective fuel injection valves 400 to 450. Moving or detaching the solenoid driver 360 permits a sensor portion 710 of fuel leakage checker 700 to pass easily through the opening portions 20A, 20B and get near respective fuel injection components.

18 Claims, 12 Drawing Sheets

COVERING DEVICE FOR AN INTERNAL COMBUSTION ENGINE

BACKGROUND OF THE INVENTION

The invention is directed to a covering device for an internal combustion engine having cylinders arranged in a V-shaped manner.

FIG. 1 shows a conventional fuel injection system. As shown in FIG. 1 (exemplifying a six-cylinder engine), a microcomputer 100 calculates a basic fuel injection amount based on intake air pressure information from an intake air pressure sensor (indicating an intake air amount) and rotational speed information from an engine rotational speed sensor, and subjects the basic fuel injection amount to various kinds of modifications based on information from a throttle opening sensor, an engine temperature sensor, and an intake air temperature sensor to calculate a final fuel injection amount corresponding to the operating condition and to calculate fuel injection timing.

Subsequently, output timers 200 to 250 output signals having a period corresponding to the calculated final fuel injection amount to solenoid drivers 300 to 350 at the injection timing calculated by the microcomputer 100, respectively. The solenoid drivers 300 to 350 control the opening and closing of built-in solenoid valves of electromagnetic solenoid type fuel injection valves (that is, injectors) 400 to 450, thereby enabling the fuel to be injected and supplied to the engine.

Combustion chamber direct injection type gasoline engines have been designed and are constructed so as to directly inject and supply fuel into the combustion chamber. Such engines usually realize combustion in the form of a homogeneous air-fuel mixture (wherein the fuel is equally dispersed throughout the entire combustion chamber), and a stratified air-fuel mixture (having (1) a layer of a combustible air-fuel mixture that is ignitable by an ignition plug, and (2) an air layer including recirculated exhaust gas and/or a layer of an air-fuel mixture having a combustible mixture ratio which is difficult to ignite by the ignition plug but is combustible by receiving the combustion flame of the aforementioned layer (1)), in the combustion chamber depending on operating conditions (speed, load condition, and the like). This permits combustion of a super-lean air-fuel ratio (an air-fuel ratio in the vicinity of the lean burning limit), which results in improvement in fuel consumption and the like, due to pumping loss reduction and other factors. Such systems are described, for example, in Japanese Patent Provisional Publication (Kokai) No. 62-191622, Japanese Patent Provisional Publication (Kokai) No. 2-169834, and Press Information entitled "Nissan Direct-Injection Engine" (Document E1-2200-9709 of Nissan Motor Co., Ltd. of Tokyo, Japan). The entire contents of these documents are incorporated herein by reference.

A direct injection type gasoline engine directly injects and supplies fuel into the combustion chamber at a relatively high pressure. This requires a fuel injection pressure higher than the pressure in the combustion chamber and requires a fuel injection pressure higher than that of a conventional intake port-fuel injection type engine.

The use of high pressure injection requires closely controlled opening and closing of the built-in solenoid valves of the fuel injection valves 400 to 450 during predetermined periods at predetermined timings. A slight difference in the opening and closing periods may cause the fuel supply amount to vary widely because the injection pressure is high. Therefore, the solenoid drivers 300 to 350 should be disposed close to the fuel injection valves 400 to 450 as much as possible in order to have signals be unaffected by harness resistance, noise, and the like. The operating voltage of the solenoid valves can be increased in order to provide high pressure injection. This also requires minimization of the voltage drop due to the harness.

However, as shown in FIG. 2, a conventional direct injection type gasoline engine has solenoid drivers at the rear portion of the engine compartment, as is the case with a conventional intake port-fuel injection type engine. Such a design lengthens the harness connecting the solenoid drivers with the fuel injection valves. This causes the signals to the solenoids in the valves to be affected by the harness resistance and noise, and the like, and makes it more difficult to supply fuel in a stable fashion and increases the voltage drop.

In the case of a V-type engine, intake system parts (intake pipe, intake collector, intake manifold, and the like) are disposed above an intermediate space between left and right cylinder banks. The cylinder row that is positioned on the right as viewed facing the front of the engine (the end of the engine to which a transmission is not connected) is referred to as "the right bank", and the left-hand cylinder row is referred to as "the left bank" as shown in FIG. 3. The fuel injection valves, fuel injection piping, and the like are disposed in this intermediate space between the left and right banks.

In a direct injection type gasoline engine, high pressure injection requires raising the fuel pressure (combustion pressure) supplied from the fuel tank to the fuel injection valves. To accomplish this, a high pressure fuel pump may be disposed in a region 500 (a space between the left and right banks at the rear end portion of the engine), as shown in FIG. 4, to be directly driven by a cam.

However, a timing chain cover is disposed at the front end of a conventional V-type engine as shown, for example, in FIG. 4. For noise reduction, to prevent jamming by foreign matter, for safely, and other reasons, conventional timing chain covers 10A, 10B are adapted to surround a crank sprocket 3 attached to one end of a crankshaft 2. Crankshaft 2 receives the reciprocating movement of a piston (not shown) as a torque by rotatably holding one end of a connecting rod (not shown) connected to the piston by a crankpin (not shown). Cam sprockets 6A, 6B, 7A, 7B are attached to end portions of camshafts 4A, 4B, 5A, 5B for actuating intake valves and exhaust valves. A mechanical power transmitting medium (such as a timing chain, various kinds of sprockets, a chain tensioner, and the like) connect the crank sprocket 3 and the cam sprockets 6A, 6B, 7A, 7B to transmit the torque of the crankshaft 2 to the camshafts 4A, 4B, 5A, 5B, and the like. Both the timing chain cover 10A and the timing chain cover 10B sandwich the crank sprocket 3, the cam sprockets 6A, 6B, 7A, 7B, and the power transmitting mechanism 8, and the like therebetween to surround them.

After completion of engine assembly (or in a state where the engine is mounted on the vehicle) when fuel is injected at high pressure, a check is performed for leakage of gasoline from respective fuel injection valves, fuel piping, and connector portions thereof. For example, a fuel leakage checker 700 having a sensor portion 710 for detecting the concentration of HC (hydrocarbons) at a leading end of a bar-like member, as shown in FIG. 5, may be used to check for leakage. The fuel leakage is checked by inserting the sensor portion 710 into a gap between various kinds of parts and bringing it near respective fuel injection valves, fuel piping, and the connector portions thereof.

However, as described above, intake system parts (such as the intake collector and the intake manifold) and the like are disposed just above the fuel injection valves, the fuel piping, and the like. The high pressure fuel pump covers the intermediate space between the left and right banks at the rear end of the engine. The timing chain cover covers the intermediate space between the left and right banks at the front end of the engine. Due to these arrangements, the sensor portion 710 of the fuel leakage checker 700 cannot get near the fuel injection valves, the fuel piping, and the like. This makes it difficult to check for leakage.

SUMMARY OF THE INVENTION

An object of the invention is to provide an improved arrangement for a direct injection engine.

Another object of the invention is to reduce the influence of harness resistance and noise, and to control the voltage drop, between solenoid drivers and solenoids.

Another object of the invention is to make it easier to check for leakage of fuel.

The invention provides an internal combustion engine having a pair of banks, each of the banks including at least one cylinder, the pair of banks being arranged separately from each other. A cover covers an end of the pair of banks on the same end as a crank shaft of the engine. The cover has an opening such that the cover does not cover at least a portion of an intermediate space, between the banks, on the same end as the crank shaft.

A fuel injector is positioned in the intermediate space to inject fuel directly into the at least one cylinder. The fuel injector includes a solenoid, and a solenoid driver for the solenoid is mounted on the cover.

A signal line connects the solenoid driver and the solenoid. The signal line passes through the opening.

BRIEF DESCRIPTION OF THE DRAWINGS

The invention will be described in further detail below with reference to the accompanying drawings, wherein.

DETAILED DESCRIPTION OF EMBODIMENTS OF THE INVENTION

Figure 1:
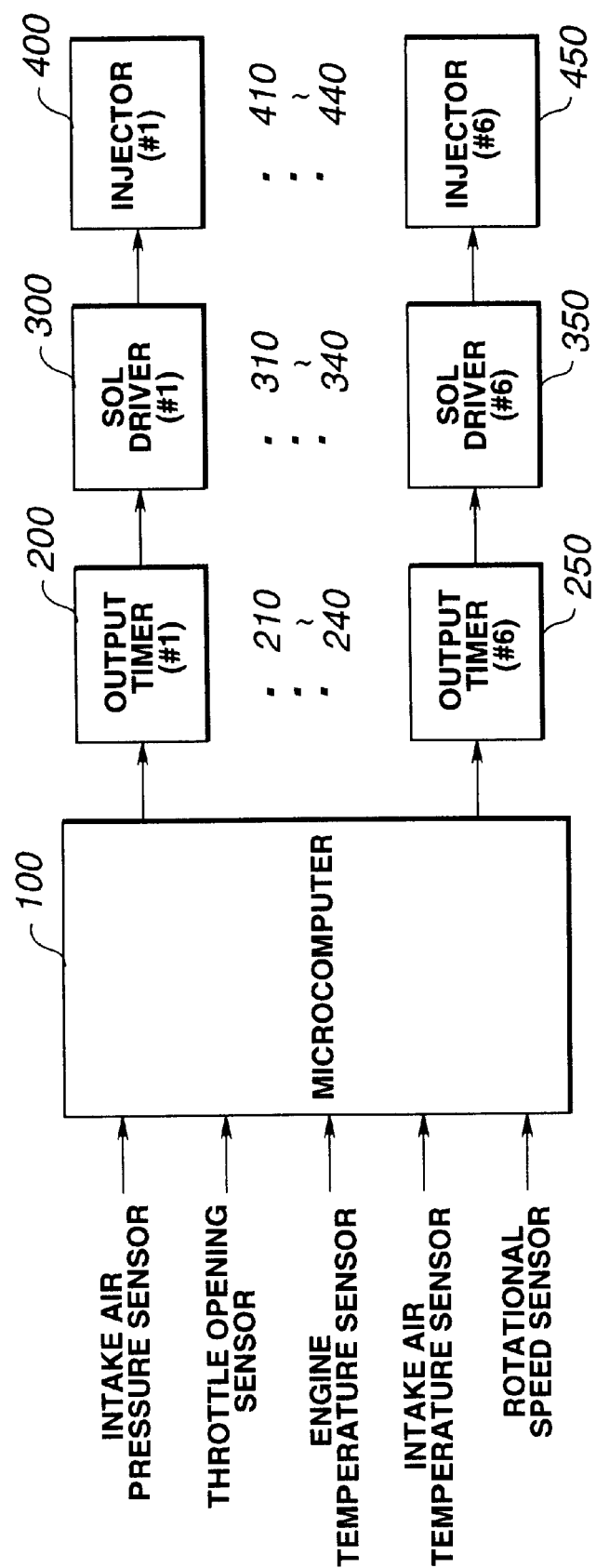
FIG. 1 is a view to explain a conventional fuel injection system.
Figure 2:
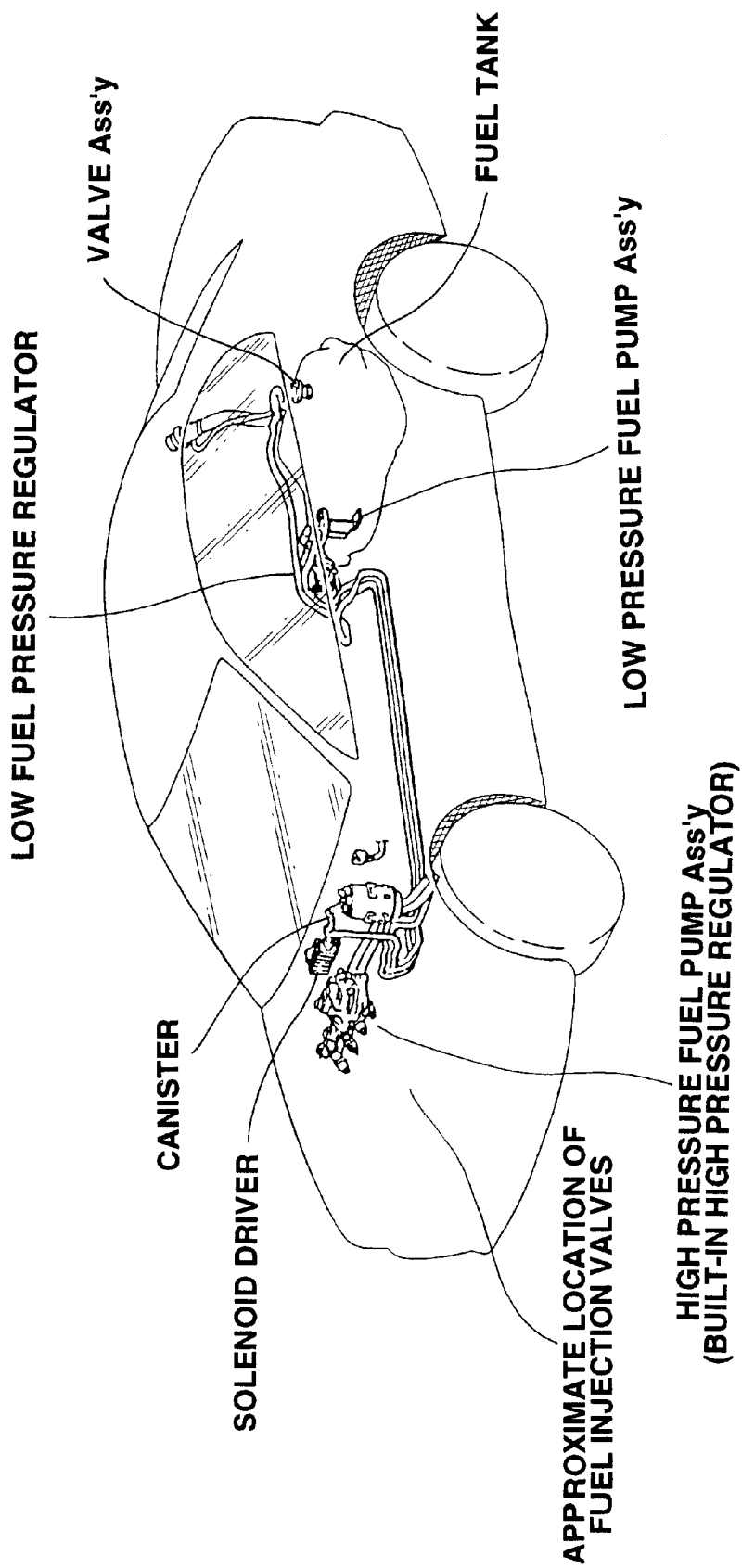
FIG. 2 is a view to explain the location at which a conventional solenoid driver is arranged relative to fuel injection valves.
Figure 3:
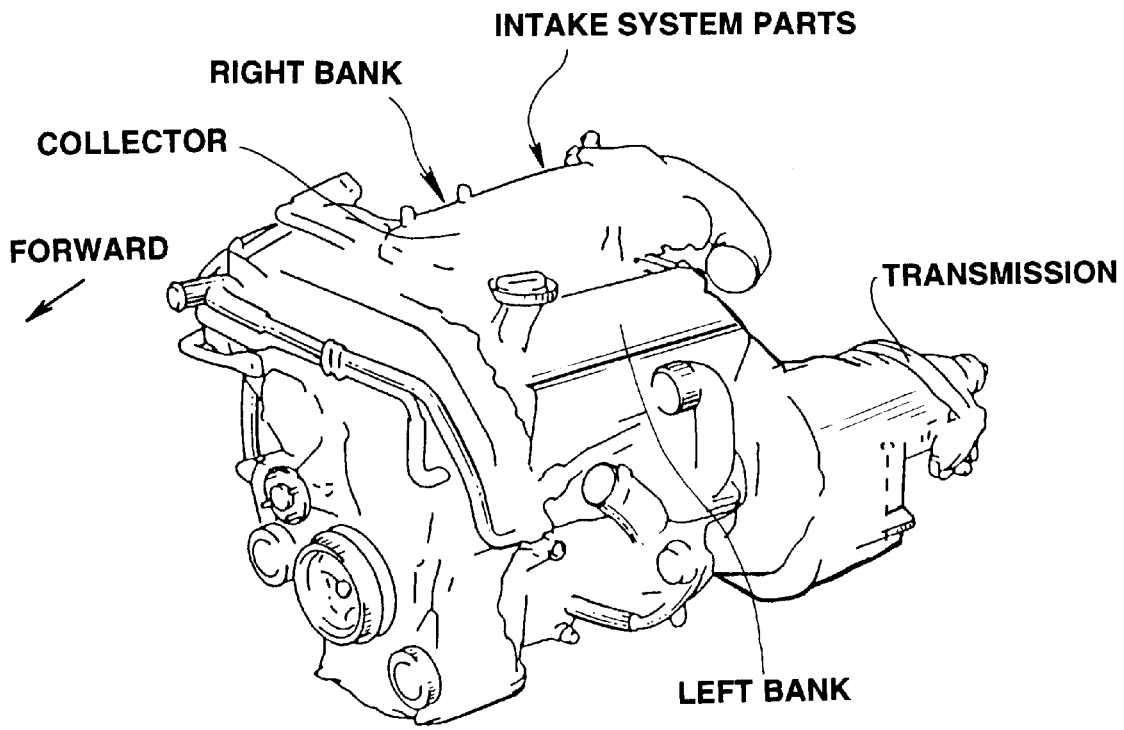
FIG. 3 is a perspective view of an engine, which is helpful in explaining the locations of intake system parts, and other components.
Figure 5:
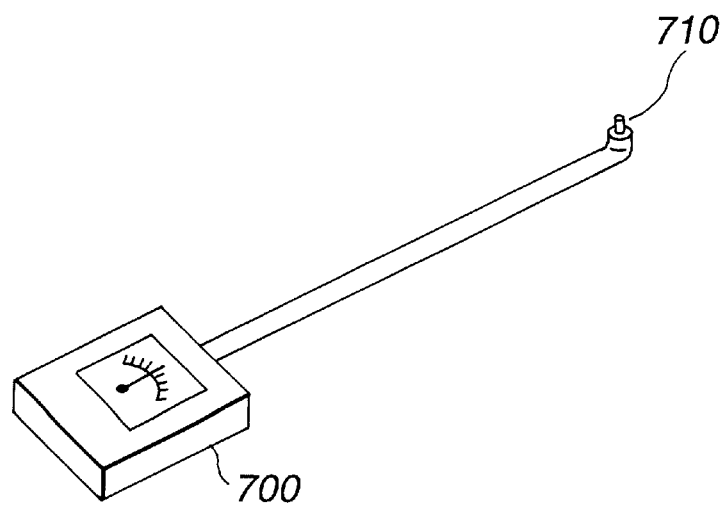
FIG. 5 illustrates a fuel leakage checker.
Figure 4:
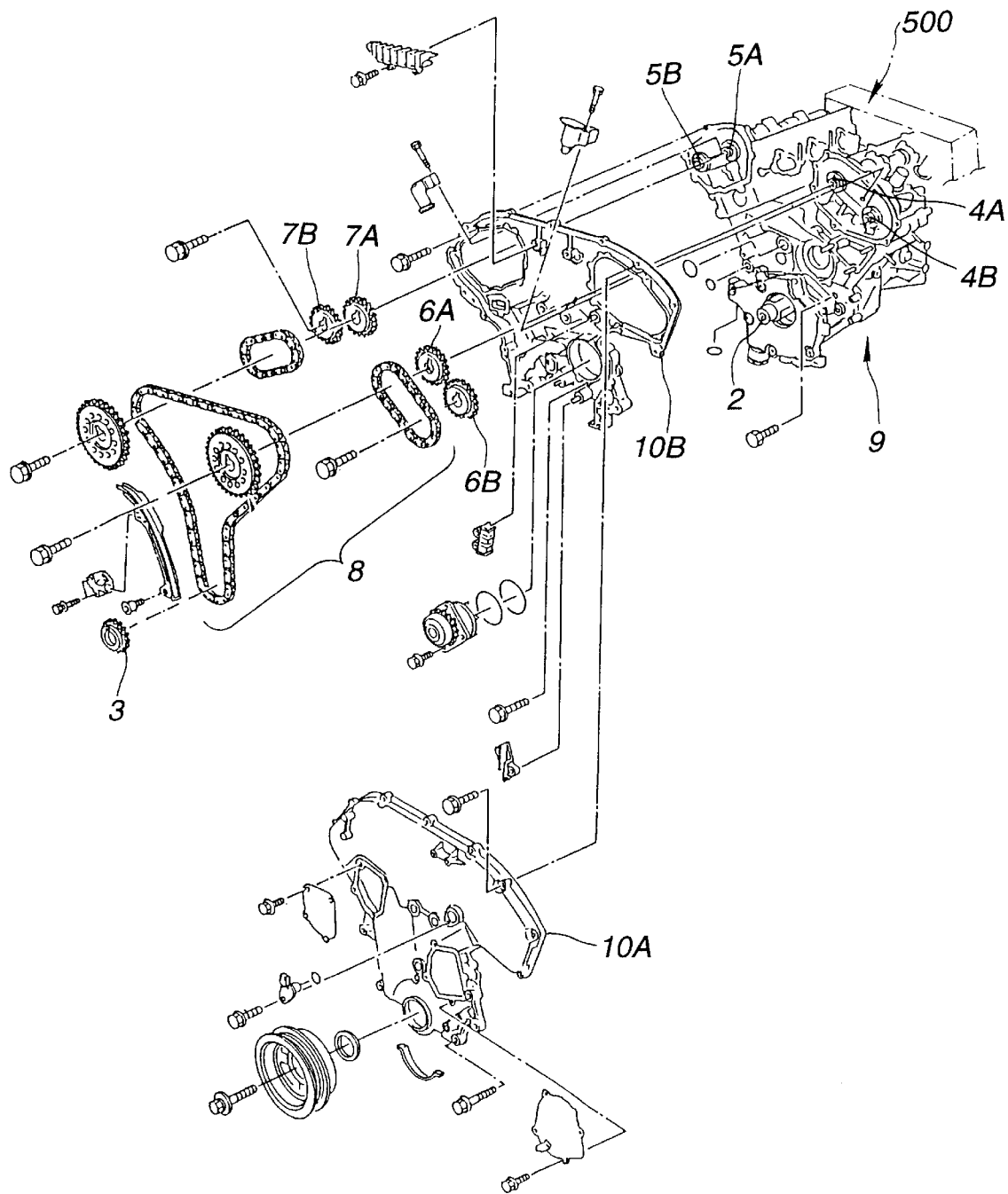
FIG. 4 is an assembly view of timing chain covers 10A, 10B and a power transmitting mechanism 8, according to the prior art.

One embodiment of the invention will now be described with reference to FIGS. 6 to 12. In the drawings, elements and parts corresponding to those in the conventional device (shown in FIG. 4) are designated by identical reference numerals.

Figure 6:
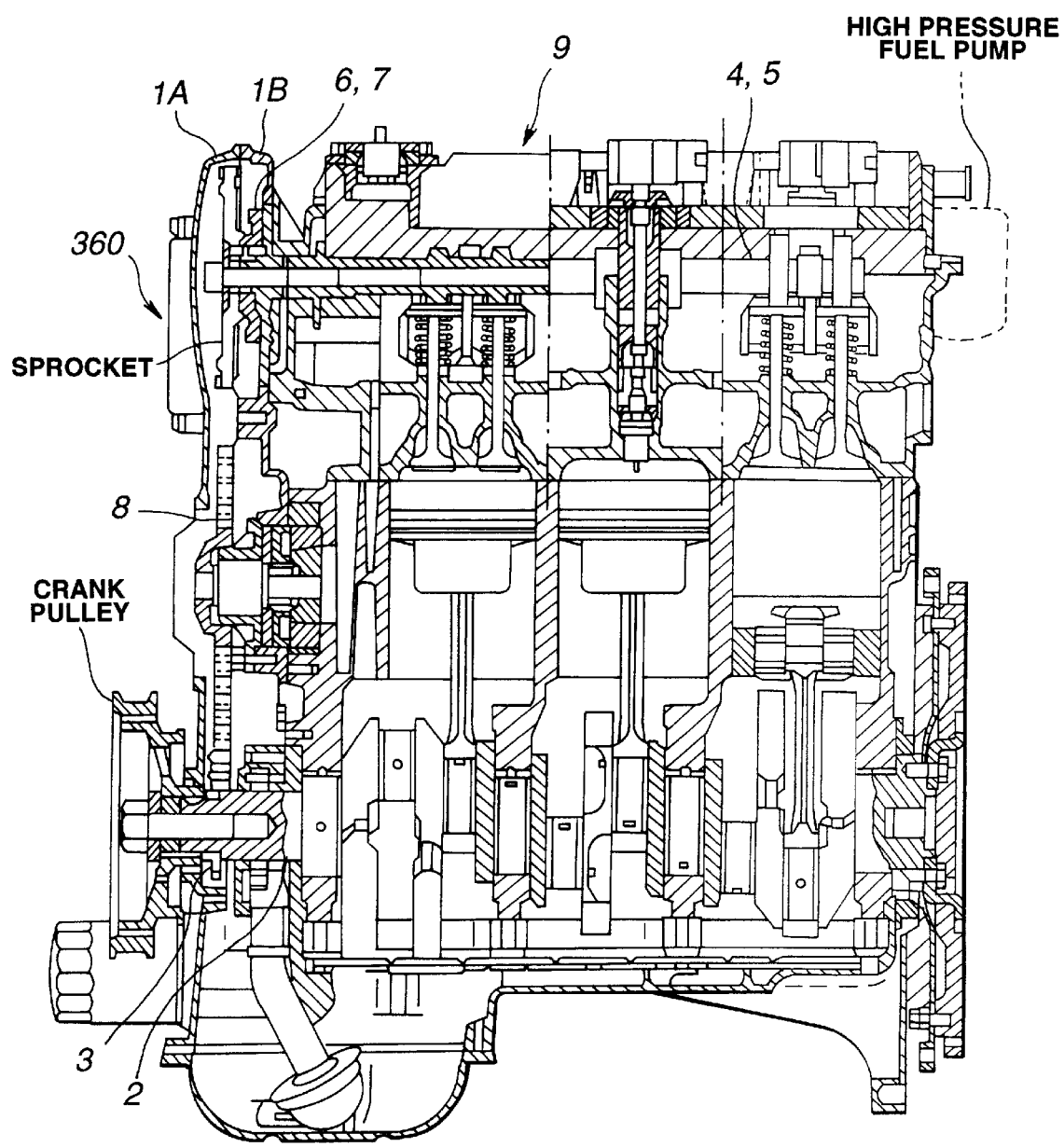
FIG. 6 is a sectional side view of an engine according to one embodiment of the invention.
Figure 7:
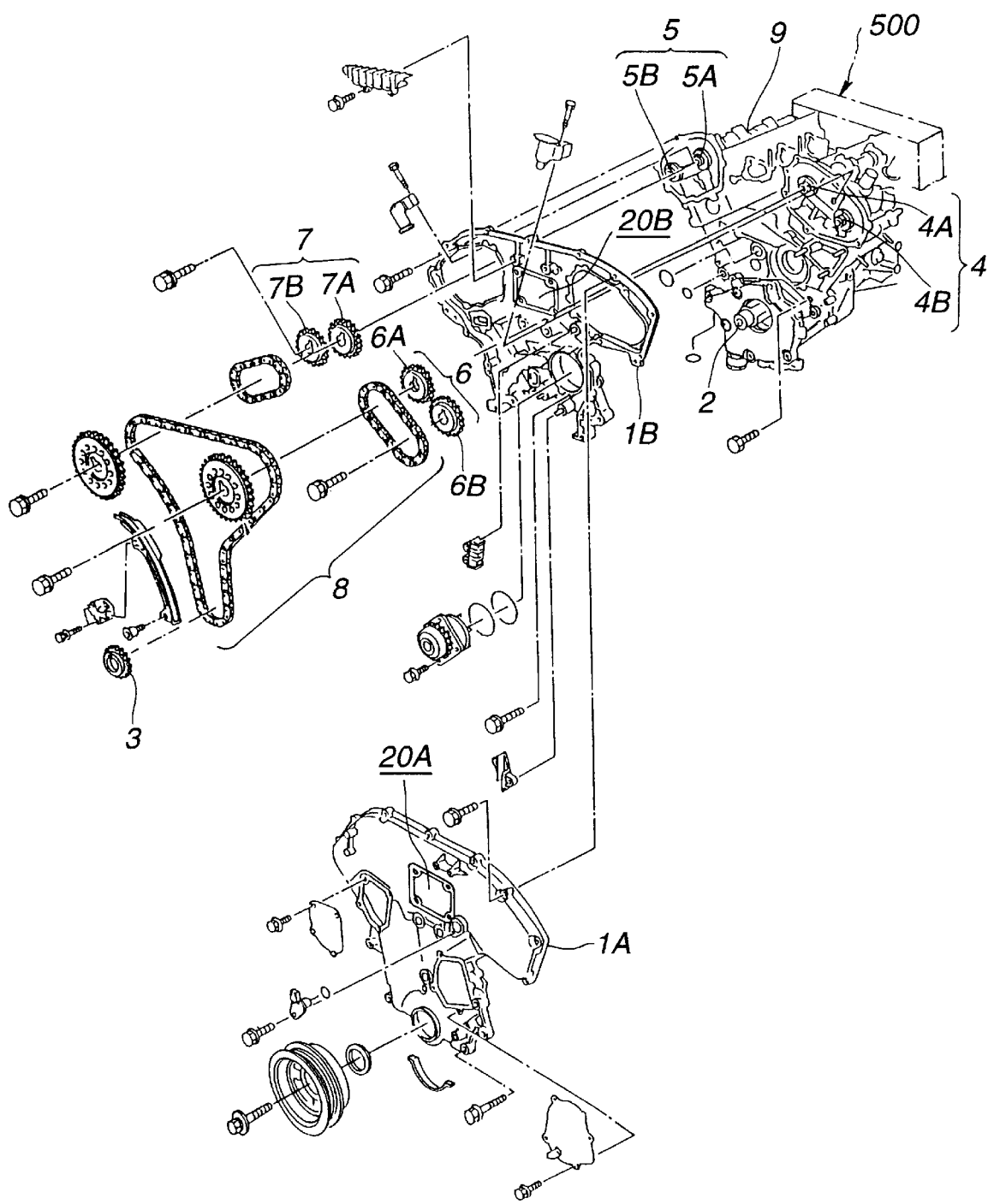
FIG. 7 is an assembly view of parts of the timing chain covers 1A, 1B and power transmitting mechanism 8, and the like according to one embodiment of the invention.

In a V-type six-cylinder direct injection gasoline engine according to one embodiment of the invention, a timing chain cover 1A (front cover) and a timing chain cover 1B (rear cover) are fixed to a front end portion of an engine main body 9, as shown in FIGS. 6 and 7. These covers are constructed so as to surround (by sandwiching therebetween in the longitudinal direction of the engine) a mechanical power transmitting mechanism 8 comprising a crank sprocket 3, cam sprockets 6A, 6B, 7A, 7B, and a power transmitting medium (such as timing chains, various kinds of sprockets, a chain tensioner, and similar components), and the like.

Figure 8:
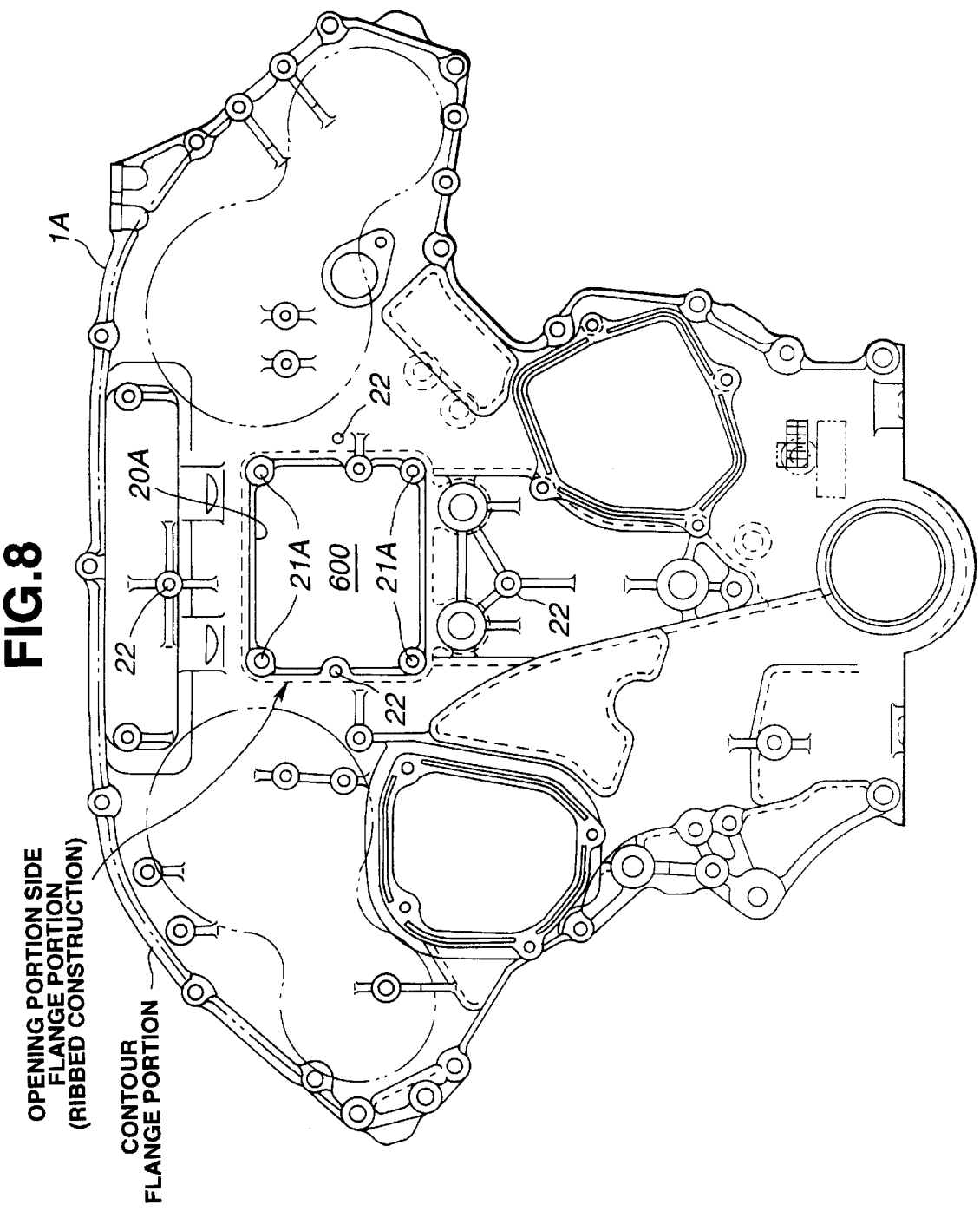
FIG. 8 is a view of a timing chain cover 1A (front end) according to one embodiment of the invention, as viewed from before the engine.
Figure 9:
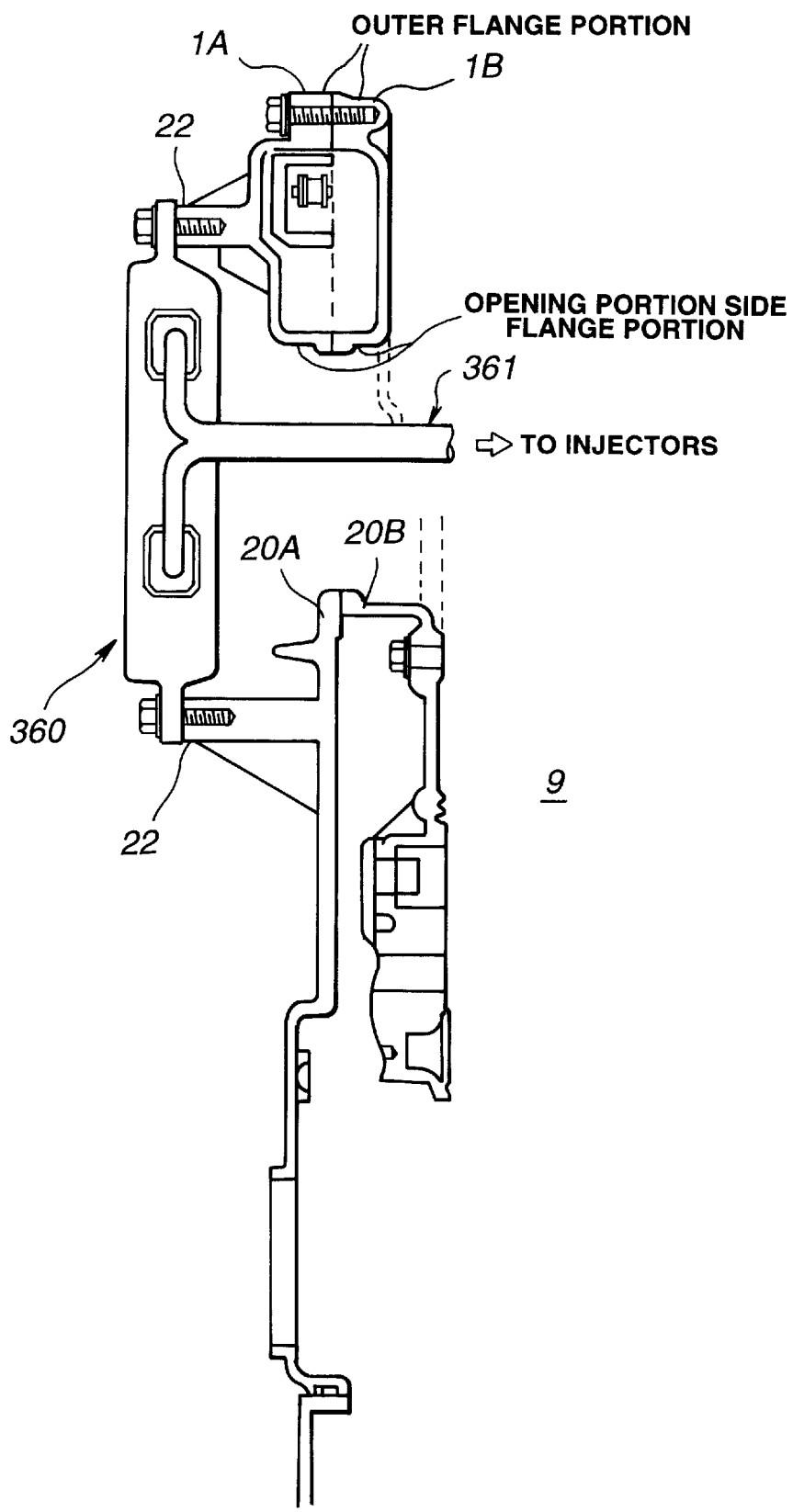
FIG. 9 is a partially sectional view of one embodiment, in which the timing chain covers 1A, 1B, solenoid driver, and harness are mounted.
Figure 10:
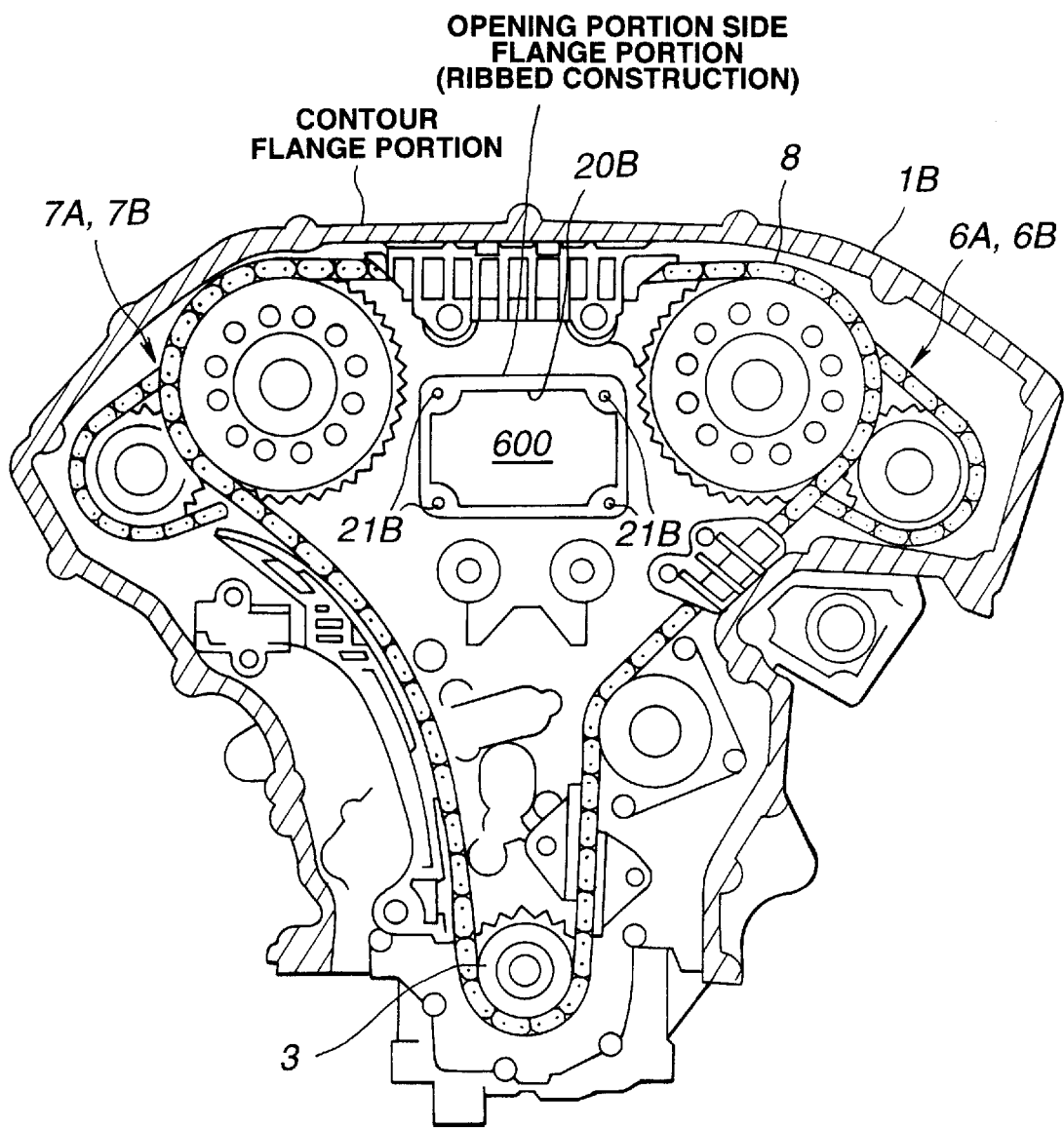
FIG. 10 is a view, as viewed from before the engine, of a timing chain cover 1B (rear end), various kinds of sprockets, a timing chain, and the like according to one embodiment of the invention (in a state in which the timing chain cover 1A is detached).
Figure 11:
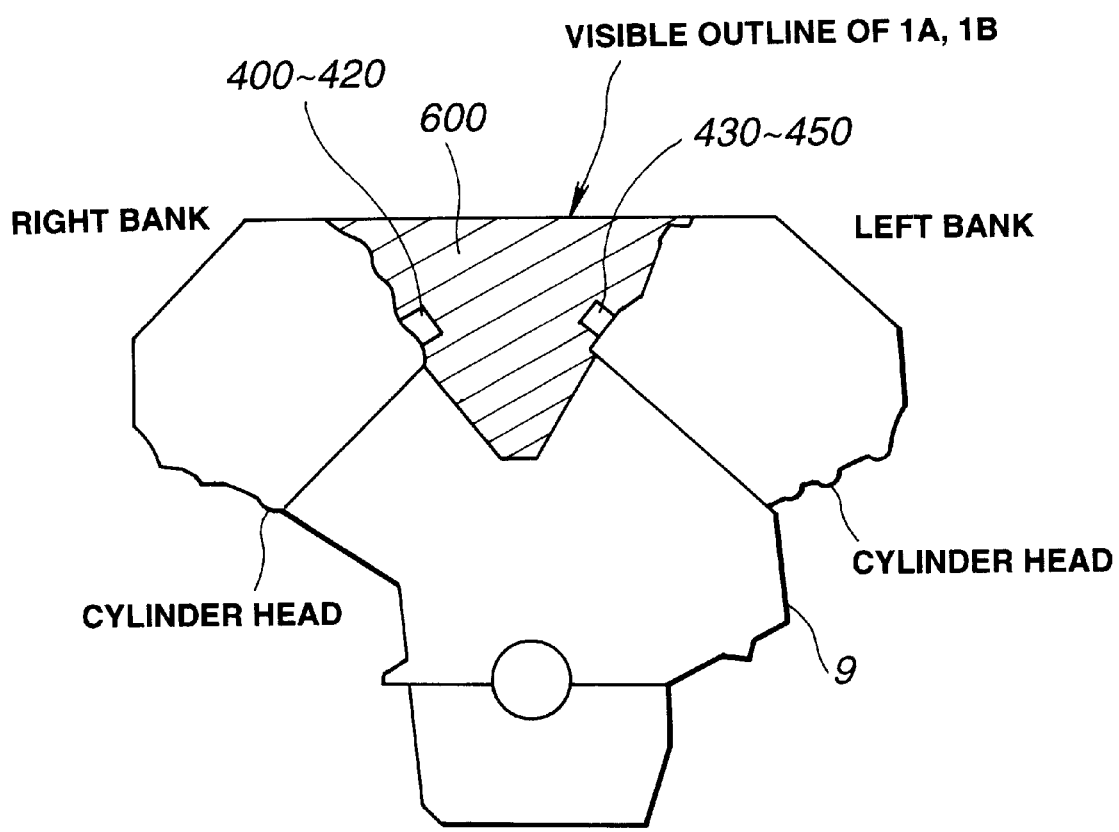
FIG. 11 is a view of one embodiment, which is helpful in explaining the intermediate space between the left and right banks.

The timing chain cover 1A (front cover) according to this embodiment is, as best shown in FIG. 8 and FIG. 9, provided with an opening portion 20A opening to an intermediate space portion 600 (hatched portion in FIG. 11) between left and right banks. (Although not shown in FIG. 11, intake components are located above the hatched portion in FIG. 11.) In this one embodiment, the opening portion is approximately 10 cm by 20 cm.

The timing chain cover 1B (rear cover) is fixed to the engine main body 9 and supports the timing chain cover 1A (front cover), and is provided with an opening portion 20B opening to the space portion 600 (hatched portion in FIG. 11) between left and right banks.

The opening portion 20A and the opening portion 20B are disposed so as to overlap each other, thereby allowing the intermediate space between the left and right banks to be in communication with the space in front of the engine main body 9 through the opening portion 20A and the opening portion 20B.

Bolt through holes 21A are disposed on the timing chain cover 1A around the opening portion 20A as shown in FIG. 8, and threaded portions 21B, into which bolts passing through the bolt through holes 21A are screwed, are disposed on the timing chain cover 1B around the opening portion 20B. Stud bolts which are capable of passing through the bolt through holes 21A may be previously screwed into the threaded portions 21B. Screwing nuts on the stud bolts enables the opening portion 20A and the opening portion 20B to be fastened together at flange portions near the opening portions. Such bolt through holes 21A, threaded portions 21B, bolts (or stud bolts and nuts), as well as other fastening techniques can be used to join the opening portions together. Providing fasteners in the vicinity of the opening portions improves the fluid-tightness of the covers and reduces noise.

The timing chain cover 1A, and the timing chain cover 1B, and, in particular, the joined surfaces of the flange portions near the opening portions and the outer flanges of the covers are coated with liquid packing or the like (for example, seal silicon set in a depression) so as to ensure oil-tightness, water-tightness and/or gas-tightness. This also minimizes noise.

Figure 12:
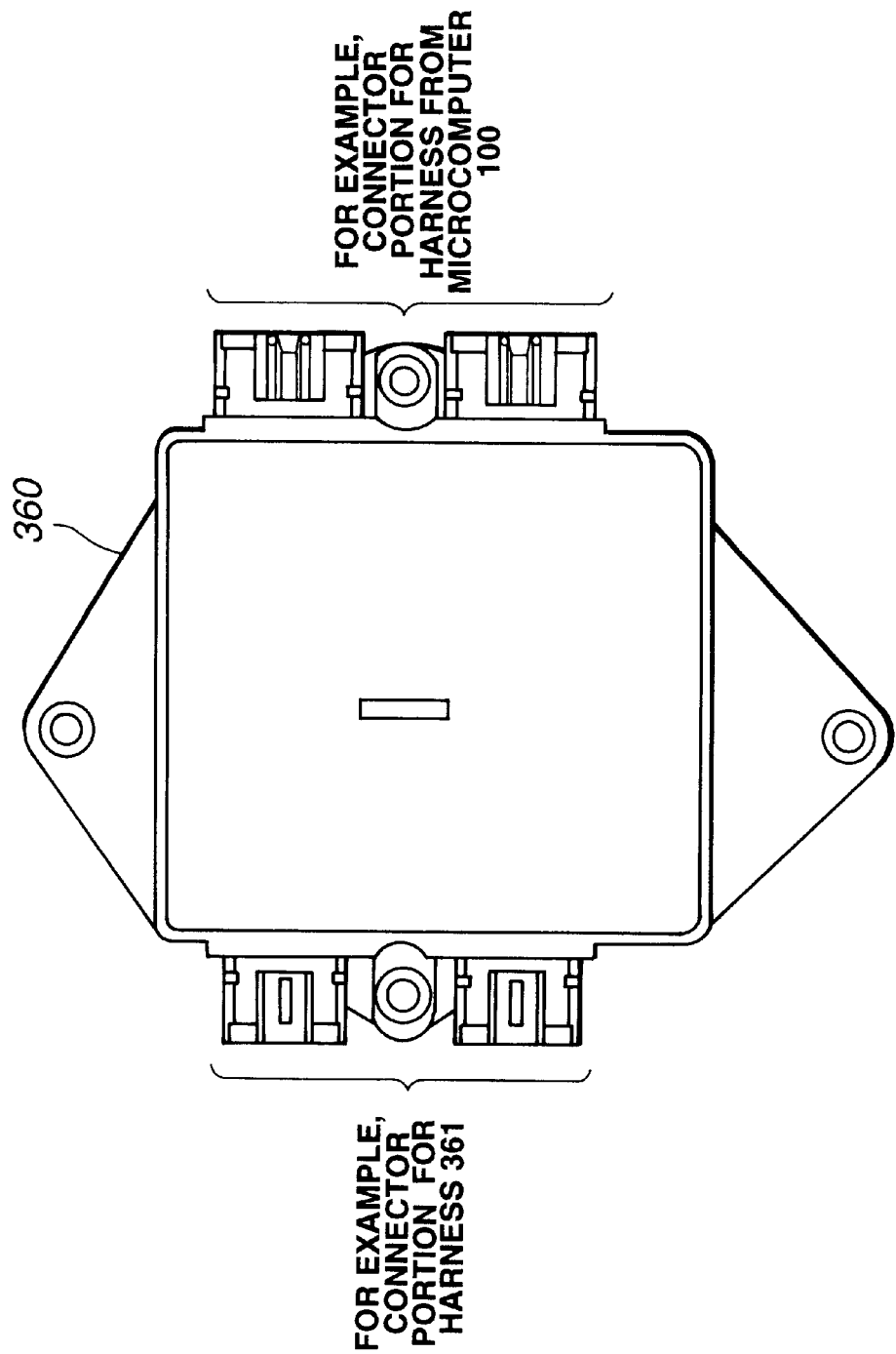
FIG. 12 is a front view of a solenoid driver in one embodiment, mounted on the engine, as viewed from before the engine.

The solenoid drivers 300 to 350 which transmit signals for controlling the opening-closing of the solenoid valves fitted in the electromagnetic solenoid type fuel injection valves (injectors) 400 to 450 are, as shown in FIG. 12, constructed as an integral-type solenoid driver 360. As shown in FIGS. 9 and 6, the solenoid driver 360 is attached to the front surface of the timing chain cover 1A through threaded portions 22 so as to cover the opening portion 20A from the front of the engine.

The fuel injection valves 400 to 450 for respective cylinders, fuel piping for supplying fuel to the fuel injection valves 400 to 450 or returning surplus fuel to a fuel tank, and related components are arranged to directly supply fuel into the combustion chambers. That is, these components are disposed in the intermediate space between the left and right banks near the lower portion of the cylinder heads.

A harness 361 extends from the solenoid driver 360 to the respective fuel injection valves 400 to 450, as shown in FIG. 9, by passing through the opening portions 20A, 20B and is then connected to the fuel injection valves 400 to 450 disposed in the intermediate space between the left and right banks, via the shortest route.

Because of this construction (wherein the opening portions 20A, 20B are disposed on the timing chain covers 1A, 1B, a solenoid driver 360 is disposed immediately in front of the opening portions 20A, 20B, and the harness 361 is connected to the fuel injection valves 400 to 450 through the opening portions 20A, 20B), the length of the harness 361 connecting the solenoid driver 360 with the fuel injection valves 400 to 450 is remarkably shortened as compared to the conventional design. This design significantly reduces the harness resistance value and the influence of noise and the like, thereby providing a more stable fuel supply and minimizing voltage drop. Moreover, a harness connecting a microcomputer 100 (which can be located, for example, in the passenger compartment) and the solenoid driver 360 can also be passed through the opening portions 20A, 20B.

Because the solenoid driver 360 is disposed on the front surface of the opening portions 20A, 20B, and the harness 361 is connected to the fuel injection valves 400 to 450 through the opening portions 20A, 20B, rearrangement of other parts is minimized. Also, the solenoid driver 360 can be attached to the engine (near the fuel injection valves) without interfering with the fuel injection valves, fuel piping, parts of the intake system, and other components.

Parts of the intake system are located above the intermediate space between the left and right banks and thus cover the fuel injection valves 400 to 450, the fuel piping, and the like. A high pressure fuel pump is disposed in region 500 so as to cover the intermediate space between the left and right banks behind the engine main body 9, as shown in FIGS. 6 and 7.

Before the invention, it was difficult to get sensor portion 710 of fuel leakage checker 700 near the fuel injection valves 400 to 450, fuel piping, and the like. However, according to this embodiment, the relatively simple work of temporally moving or detaching the solenoid driver 360 enables the sensor portion 710 of the fuel leakage checker 700 to pass through the opening portions 20A, 20B and then get near the respective fuel injection valves 400 to 450. Visual checks and other checks are also easier. This enables leakage checking in a simple manner and with high precision.

Because both opening portions have flange portions near the opening portions and are joined to each other, vertical wall construction (ribbed construction) is increased in both the timing chain cover 1A and the timing chain cover 1B while substantially reducing weight. This increases the rigidity of the timing chain covers in addition to reducing weight. This also substantially reduces the radiation area of noise, thereby reducing radiated noise emitted from the surface(s) of the timing chain covers.

Also, the opening portion side flange portion for the opening portion 20A of the timing chain cover 1A and the opening portion side flange portion for the opening portion 20B of the timing chain cover 1B are fastened by bolts or the like. This further controls the surface vibration of the timing chain cover 1A, and also reduces the radiated noise from the surface of the timing chain cover.

Various modifications of the above-described design are possible.

For example, although this embodiment is directed to a six-cylinder engine, the invention is not restricted to this embodiment. The invention can be applied to other V-type engines having at least two cylinders.

The solenoid driver 360 is disposed so as to cover the opening portions 20A, 20B, in the above embodiment. However, the invention is not restricted to this design. For example, the solenoid driver 360 may be located at other locations on the timing chain cover 1A.

Also, the opening portion for communicating a portion either before or behind the engine with the intermediate space between the left and right banks is in a timing chain cover. The timing chain cover is disposed before the engine main body 9, in the embodiment. However, when the power transmitting mechanism 8 (such as crank sprocket 3, cam sprockets 6A, 6B, 7A, 7B, and other transmitting mediums such as a timing chain, various kinds of sprockets, chain tensioner, and the like) is disposed behind the engine, the invention can be applied to such a timing chain cover disposed behind the engine. Further, although the above detailed description is directed to a timing chain cover, it is clear that a casing and the like for surrounding a timing gear or belt are included in the scope of the invention.

Figure 13:
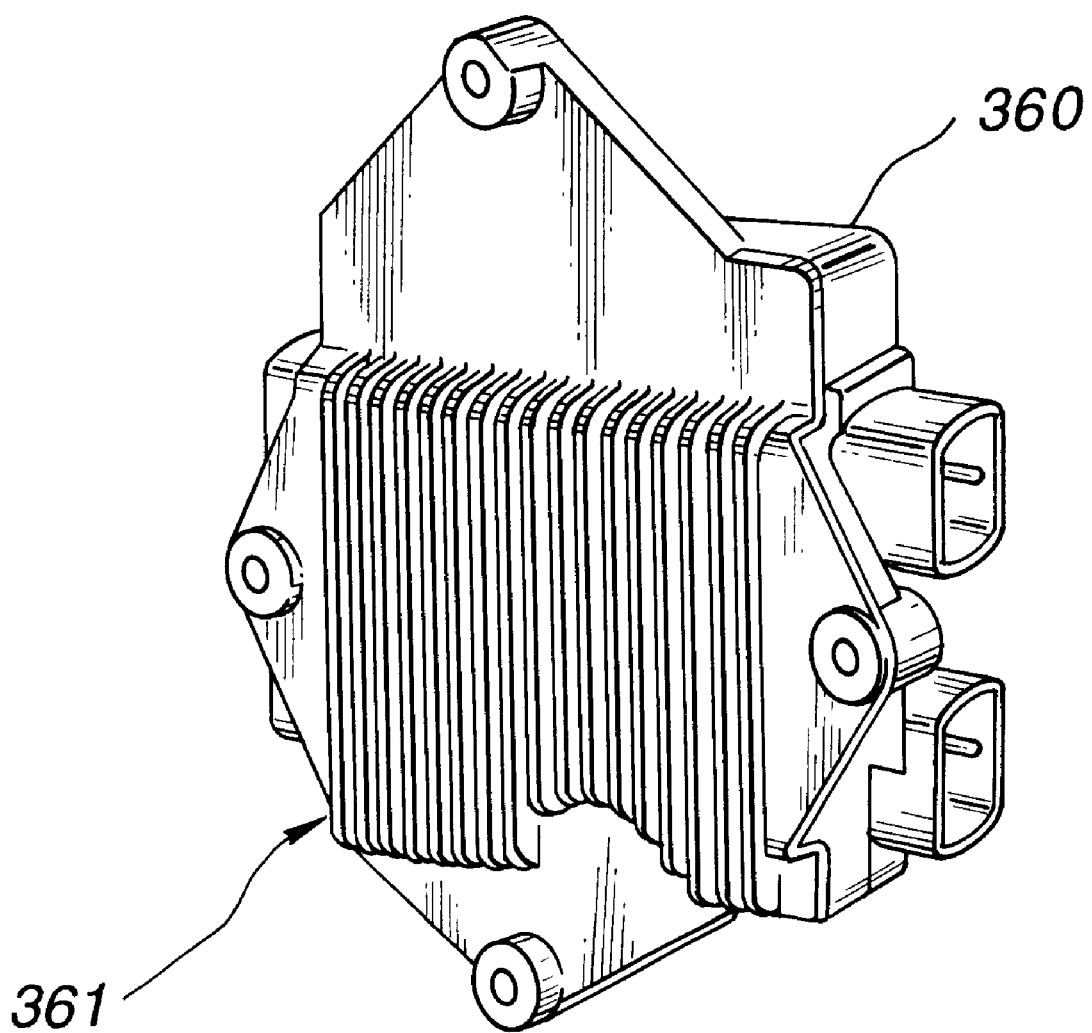
FIG. 13 is a perspective view of a modified solenoid driver.

Driver 360, as shown in FIG. 13, can be provided with cooling fins 362 on the rear end of the driver to dissipate heat generated in the electronics in the driver. The fins 362 may face the opening portions 20A, 20B.

In the above embodiment, the timing chain cover 1B is concave shaped so as to surround the power transmitting mechanism 8. However, the invention applies to a situation in which a plate member (a so-called end plate) having a contour corresponding to the contour flange portion of the timing chain cover 1A is fixed to the engine main body 9 and then the timing chain cover 1A is fastened thereto, without forming the timing chain cover 1B in the shape of a cover (that is, concave).

As mentioned, the invention is not restricted to a timing chain cover device. The invention can be applied to any other covering device of an engine insofar as it is formed so as to cover the front end or the rear end of the intermediate space between the banks. For example, the invention can be applied to soundproof covers, thermal insulating covers, cooling water-proof covers, and the like. Also, although the embodiment is directed to a DOHC (double overhead cam)

engine, the invention is not restricted to this embodiment. For example, the invention can be applied to single overhead cam shaft type engines, and also to OHV type engines in which the camshaft is located below the head.

Further, the invention is not restricted to direct injection type internal combustion engines. The invention can be applied to intake port-fuel injection type internal combustion engines, and also to various other kinds of engines such as diesel engines, and alcohol engines as well as gasoline engines.

The opening portions can be formed by a separate piece which is not integral with covers 1A and 1B. Such a separate piece is sandwiched between the timing chain cover 1A and the timing chain cover 1B. Also, each of the covers can be formed from separate left and right pieces.

The entire contents of Japanese Patent Application No. 9-138459, filed May 28, 1997, is incorporated herein by reference.

Although the invention is described above by reference to certain embodiments of the invention, the invention is not limited to the particular embodiments described above. Modifications and variations of the embodiments described above will occur to those skilled in the art. For example, the opening portion can be a square having 1 cm sides, a circle having a 1 cm diameter (0.8 cm$^2$ in area), or any shape having an area which would allow access of a leak checker to the fuel supply mechanism in the intermediate space between the left and right banks. The invention is therefore defined with reference to the following claims.

We claim:

1. An internal combustion engine, comprising:
   a pair of banks, each of the banks including at least one cylinder, the banks arranged separately from each other;
   a cover covering an end of the pair of banks, the cover having an opening such that at least a portion of an intermediate space, between the banks, is not covered by the cover; and
   a fuel injector positioned in the intermediate space;
   wherein the area of the opening allows access of a leak checker through the opening to the fuel injector in the intermediate space.

2. An engine as set forth in claim 1, wherein the fuel injector includes a solenoid and wherein a solenoid driver for the solenoid is mounted on the cover.

3. An engine as set forth in claim 2, wherein a signal line connects the solenoid driver and the solenoid and the signal line passes through said portion of the intermediate space, between the banks, not covered by the cover.

4. An engine as set forth in claim 1, wherein the area of the opening exceeds 0.8 cm$^2$.

5. An engine as set forth in claim 1, further comprising:
   a solenoid for the fuel injector;
   a solenoid driver; and
   a signal line connecting the solenoid driver and the solenoid and passing through the opening.

6. An engine as set forth in claim 1, wherein the cover covers a mechanical power transmitting medium which transmits power from a crank shaft.

7. An engine as set forth in claim 1, wherein the intermediate space is bounded at the top of said engine by intake system components.

8. An engine as set forth in claim 1, wherein the cover includes a flange portion defining the opening.

9. An engine as set forth in claim 8, further comprising at least one fastener in the vicinity of the flange portion to secure the flange portion.

10. An engine as set forth in claim 8, wherein said flange portion is fluid-tight.

11. An engine as set forth in claim 1, wherein the banks are arranged in a V-shape.

12. An internal combustion engine as set forth in claim 1, wherein the cover is on the same end as a crank shaft of the engine.

13. An engine as set forth in claim 1, wherein the fuel injector is positioned in the intermediate space to inject fuel directly into a cylinder.

14. A vehicle, comprising:
    a body; and
    an internal combustion engine mounted in the body, including
       a pair of banks, each of the banks including at least one cylinder, the banks arranged separately from each other;
       a cover covering an end of the pair of banks, the cover having an opening such that at least a portion of an intermediate space, between the banks, is not covered by the cover; and
       a fuel injector positioned in the intermediate space;
       wherein the area of the opening allows access of a leak checker through the opening to the fuel injector in the intermediate space.

15. A vehicle as set forth in claim 14, wherein the cover is on the same end as a crank shaft of the engine.

16. A vehicle as set forth in claim 14, wherein the fuel injector is positioned in the intermediate space to inject fuel directly into a cylinder.

17. An internal combustion engine, comprising:
    a pair of banks, each of the banks including at least one cylinder, the banks arranged separately from each other;
    a cover covering an end of the pair of banks, the cover having an opening such that at least a portion of an intermediate space, between the banks, is not covered by the cover; and
    a fuel injector positioned in the intermediate space;
    wherein the area of the opening allows access of a leak checker through the opening to the fuel injector in the intermediate space, and wherein at least a portion of the opening and the fuel injector lie above a plane defined by (1) a top-most portion of a cylinder-block extension portion for a left cylinder bank and (2) a top-most portion of a cylinder-block extension portion for a right cylinder bank.

18. An engine as set forth in claim 17, wherein the fuel injector is positioned in the intermediate space to inject fuel directly into a cylinder.

* * * * *